UNITED STATES PATENT OFFICE.

ROBERT L. CORBY, OF CHEVY CHASE, MARYLAND, ASSIGNOR, BY MESNE ASSIGNMENTS, TO THE FLEISCHMANN COMPANY, A CORPORATION OF OHIO.

COMPOSITION OF MATERIALS ADAPTED FOR USE IN BREAD-MAKING.

1,355,127.     Specification of Letters Patent.     Patented Oct. 12, 1920.

No Drawing. Application filed July 15, 1915, Serial No. 40,029. Renewed February 5, 1920. Serial No. 356,417.

*To all whom it may concern:*

Be it known that I, ROBERT L. CORBY, a citizen of the United States, and a resident of Chevy Chase, in the county of Montgomery and State of Maryland, have invented certain new and useful Improvements in Composition of Materials Adapted for Use in Bread-Making, of which the following is a specification.

This invention relates to a composition of materials adapted for use in bread making, and which, when employed as one of the initial ingredients of a dough batch, gives superior qualities to the bread loaf that is finally produced and reduces the cost of bread manufacture.

Among the objects of the invention is to provide a composition which (a) will not, of itself, act diastatically upon the starch components of the flour in the dough batch; (b) will not have proteolytic action upon the nitrogenous ingredients of the flour; (c) will have a characteristic action of its own upon the said nitrogenous elements to render the gluten more elastic and coherent; (d) will insure a superior texture for the interior of the finished loaf; (e) will produce a palatable crust of pleasing color at relatively low temperature; (f) will enlarge the volume of the dough loaf in a relatively short period of time; (g) will insure the maintaining of an enlarged volume until the bread is finally baked; (h) will permit the reduction of the yeast in the dough batch to a small percentage of that usually used; (i) will contain materials whose actions give the desired texture and color of the interior and of the crust without requiring the addition of cane sugar in the dough, and (j) will have sugary components of such nature that, in the making of sweet doughs, a larger quantity of such sugary components can be added without affecting the fermentive action of the yeast than is the case where bodies of the cane sugar class are employed in the dough.

I will specify a composition, which can be regarded as typical of several, that will embody my improvements.

It is a mass containing water in the proportion of fifteen to twenty-five per cent., together with saccharine matters, about seventy per cent., these comprising maltose, dextrin and dextrose, also nitrogenous matter of approximately eight to ten per cent., and mineral salts, such as phosphates of potassium, calcium and the like, and approximating one to two per cent.

I prefer, as the sugary contents, bodies of the maltose, dextrose and dextrin class, in contrast with those of the cane sugar class, because the ferments (such as yeast) to be introduced at a later stage as an ingredient of the dough are stimulated more quickly by sugar bodies of the first class when of ordinary constitution.

The nitrogenous bodies which I utilize I prefer to be of the classes that are ordinarily found in seeds or cereals, such as the albumins, the peptones and the amids, which may be obtained by any of the numerous processes of treatment of such cereals.

The maltose, dextrose and dextrin, and also the nitrogenous materials, are, under many circumstances, apt to contain, or to be accompanied by, smaller or larger quantities of starch and starch-modifying materials, such as diastase, or the like, whether obtained as articles of commerce or otherwise, it being difficult to thoroughly separate or isolate the sugars of this class.

Again, both the sugary bodies and the nitrogenous materials, particularly the latter, may be found accompanied by proteolytic materials which have a tendency to act upon, or break down, proteins under favorable conditions.

Moreover, organized ferments, in one or another of various forms, are almost always present with the starch, maltose, dextrin and proteids.

But the aim is to have my composition rendered inactive or inert, in respect to any of these three agencies just specified, that is inert so far as concerns the activities of any ordinary ferments, organized or unorganized. There should be no diastatic action upon the flour after the dough is formed. Nor should there be any proteolytic action upon the nitrogenous materials of the flour. And all stray organized ferments must be also inert.

Again, the composition should be of such nature that it will be devoid of nitrogenous or proteid matters that are susceptible to coagulation when subjected to heat. Yet it should have as much as possible of beneficial nitrogenous matter, and in a soluble and assimilable condition. For these purposes I strongly acidify the composition. I select an acid which has:

First the capability of (1st) preventing stray organized ferments from acting either within the composition or upon the flour of the dough; (2nd) of so modifying any unorganized ferments that may be present (such as diastase or protease) that their efficiency will be practically destroyed; that is, modifying them so that they will not only be inert in relation to any of the other ingredients of the composition, itself, but also inert in respect to those activities which such ferments ordinarily exert upon the components of the flour in a dough batch;

Second, the capability of itself acting (subject to control) upon the nitrogenous materials or proteids in the composition for several purposes:

A. These nitrogenous materials contain some components which are non-coagulable at any time, even when subjected to heat, and also contain others which are coagulable, and which it is desirable to render non-coagulable, even when subjected to heat. If those nitrogenous components which are coagulable are allowed to remain in that condition and are introduced with the composition into the dough, they are apt to give undesirable color to the bread when subjected to the high heat of the oven.

And, to prevent this, I utilize the acid in such way that (if there be no coagulated proteids present) it will make non-coagulable practically all of the originally coagulable protein bodies, and therefore insure that they shall neither affect the color of the composition or that of the flour and bread, although all the nitrogenous ingredients of the composition are beneficially retained in the bread. If there should chance to be present with the other ingredients of the composition both coagulated and non-coagulated proteids, the acid will render non-coagulable all of that part which is coagulable, and in such case I effect a separation of the coagulated parts from the residue of the composition by some suitable treatment, such as filtering; this procedure also avoiding undesirable discoloring of either the composition or of the flour and bread;

B. The acid has the capacity of also inducing the hydrolyzing of the proteid bodies in the presence of proteolytic material, such as protease, that is, of forming peptones, and the like, so that the proteids become soluble and assimilable by yeast, or similar ferment.

I can use either of several acids for these lately specified purposes (neutralizing the diastase and protease, digesting the proteid and rendering the latter non-coagulable), although I prefer one of the organic acid class, such as acetic, lactic and other acids, having found the lactic acid the most suitable.

After commencing the acidification I gradually increase the acidity, allowing time for the acid to accomplish each of its several functions. It generally, while in a relatively weaker stage, affects the starch-modifying bodies, such as diastase and amylase; but at later stages, and when a considerably higher percentage of the acid is present, renders inactive the proteolytic bodies, and also acts upon the nitrogenous material to digest it and to produce in the latter the results above specified.

When the acidification has reached a relatively high point I stop increasing the amount of the acid. The diastase and protease are now permanently inert and no longer capable of revival, and any stray organized ferments have been rendered permanently harmless, the nitrogenous materials have been properly modified and digested for the nourishing of a subsequently added ferment such as yeast.

While I have described, and prefer, gradual acidification, I am not limited thereto, but may add at one time the entire amount of acid desired, especially where an inorganic acid, as hydrochloric, is used.

The typical composition that has been specified (but to which I do not limit myself) can, for present purposes, be now regarded as composed of seventy per cent. of sugary masses of the maltose, dextrose and dextrin class, all of the diastase and protease which may have possibly accompanied them at any time being now permanently inert, eight to ten per cent. of nitrogenous matter (modified, as aforesaid, in respect to solubility, coagulability, digestibility, etc.), acid from six tenths to two and a half per cent., mineral salts from one per cent. to two per cent., and water from fifteen to twenty-five per cent. If an inorganic acid is utilized, such as hydrochloric, it is sometimes advantageous to first introduce a small amount of alkali, such as ammonia, as this can be employed to not only assist in properly regulating the action of the acid, but will itself act in neutralizing the starch-modifying and protein-modifying enzyms, and any ammonium chlorid which is formed as one of the resulting salts is, as well known, a beneficial ingredient in the dough.

It will be understood that within substantially the limits named the degree of acidity will vary with different acids and for different flours. For example, a lesser amount of hydrochloric acid than of lactic acid would be required to meet the same conditions, and a higher percentage of acidity would be employed for strong flours than for weak ones.

If the above ingredients (the maltose, dextrose and dextrin, and the nitrogenous materials, such as the peptones, albumins and amids) are obtained as articles of commerce, care should be exercised to select those which are not largely accompanied by either the diastatic, the proteolytic, or the organized ferments, as it is not desirable to excessively acidify the composition, unless it is subsequently partially neutralized, and, if lactic acid is selected it is preferable to have it of the stronger sorts, so that it will effectively and permanently neutralize all of the ferments.

It will be seen that the composition I provide is, at the time it is introduced with the flour as a dough ingredient, non-diastatic, non-proteolytic, devoid of active organized ferments, and relatively highly acid; and in these respects it is peculiar when compared with earlier compositions proposed for this purpose. I believe it to be the first dough ingredient of this class which has been characterized by each and all of these qualities, predeterminedly aimed at for the accomplishment of certain results in the flour of the dough, in relation to the yeast and the supplemental saccharine materials commonly added to dough as components of the mixture.

And that its actions from the time it is mixed with the dough through the successive stages, terminating with the baking of the bread, may be understood, I will briefly describe, typically, first, an ordinary dough batch mixture, second, a mixture characterized by the presence of diastatic and proteolytic compositions (generally obtained as extracts of malted grain or wort), and third, a dough batch containing my present composition.

In the first case, with one hundred pounds of flour are mingled sixty-two pounds of water, three and a half pounds of cane sugar, two pounds of salt (chlorid of sodium), and two and a half pounds of yeast. The cost for the yeast in a bakery turning out fifty thousand sixteen ounce loaves per day is about eighty dollars per day.

In the second case, with the hundred pounds of flour are mingled sixty-two pounds of water, one and a half pounds of malt extract containing diastase and protease, one and a half pounds of sugar, one and three-quarters pounds of yeast, two pounds of salt (chlorid of sodium).

In the third case, where my composition is used, with one hundred pounds of flour are mingled sixty-two pounds of water, three and a half pounds of the compound, two pounds of salt, and three-quarters of a pound of yeast. Considering the economy in yeast alone, there is a saving in the above ratio of over forty dollars a day; and as concerns the saccharine matter, no cane sugar is required, my composition carrying such a relatively large percentage of the maltose and dextrose that the usual cane sugar can be dispensed with.

But, beyond this, the following important matters are to be noted:

The dough batch containing my composition, after the usual mixing, is subjected to the usual fermentation, loaf-forming, proofing and baking.

Having left no trace of diastase or protease, the dough mixture is strongly contradistinguishable from those containing the usual malt extracts, for making which conditions are intentionally selected, and steps purposely taken, which leave in the compound as much as possible of the diastatic and proteolytic materials.

First, in relation to the important results attained in the dough and in the bread, when I purposely eliminate all of the diastatic bodies: These, as is well known, rapidly cause the liquefying and dissolving of the starch bodies and convert it into sugar and dextrin (gum) in the presence of a liquefier or solvent; for example, where there is an abundance of water and a proper temperature. But, if diastase, or the like, gain entrance to a dough batch where there is relatively little water and the temperature is low 26 to 32° C., they (if possessed of full activity or if their activity is merely suspended) remain temporarily inert, or are slow in exerting a starch-modifying activity. But it is merely a suspension of their activity; and this will again assert itself as soon as the proper conditions of temperature and moisture are again presented. Experience shows that these suspended diastatic materials may remain inactive during the mixing of the dough and during the stages of fermentation and of loaf-forming, and even of loaf-proofing. The temperature at these stages is relatively low, and the quantity of accessible moisture is small in comparison with that required to revive and hasten diastatic action; and therefore, during these stages the transforming of the starch of the dough flour into a soluble or saccharine form is slow.

But as soon as the dough loaf is introduced into the baking oven, its temperature rapidly rises. Its interior moisture rapidly becomes steam, and this is confined by the rapidly forming shell-like crust. The starch quickly softens and becomes more or less soluble, and the diastatic material, under this temperature and favorable condition, revives and becomes rapidly active in its work on the starch. The latter is broken down into a viscid or gummy substance, which not only deteriorates the interior texture of the loaf, but renders difficult its thorough and proper baking and increases the period of time required. During this prolonging of the time of baking the crust further hardens and increases in thickness, and the escape of the moisture becomes more difficult, further increasing the softening or gumming of the mass. And the action of the diastatic matters on the starch in the interior of the loaf while in the baking oven, as is well known, deteriorates the color of the flour and of the bread texture, turning it disagreeably brown.

In short, I have found that all of those dough ingredients which are characterized by the presence of diastase, or other starch-modifying bodies, such as the earlier extracts from grain and malt, have been deleterious, in respect to good texture and color in bread.

Second, as noted, I eliminate not only the diastatic, but also the proteolytic bodies which may have been present in, or found access to, any of the original ingredients of my composition, whether of the sugary class or of the nitrogenous. If these proteolytic materials find access to the flour of the dough they begin at once to attack the proteids, for their activity is exerted at a lower temperature and with less moisture than is the case with the diastatic bodies. Hence, as above described, I render them permanently inert (by the action of the acid, or equivalent) before they can contact with the flour of the dough. I carry the acidifying to a point where they cannot become active during any of the entire cycle of steps from the initial mixing of the dough ingredients to the finishing of the baked bread, even though there is an abundance of the nitrogenous gluten and other proteids in the flour. These flour proteids induce rapid and extensive activity of the proteolytic bodies in the ordinary extracts of grain and malt which have been heretofore proposed as dough ingredients, and they continue this activity, during the fermentation and proofing stages, irrespective of the temperature and quantity of moisture then present, and even continuing for some time after the commencement of baking.

I have found that the result of this action of the proteolytic enzyms on the gluten and nitrogenous materials of the flour is to render the gluten more fragile, and therefore produces a softer dough.

My composition does not act in this manner on the gluten, as the proteolytic matter therein has been rendered permanently inert. The relatively large percentage of acid which I use acts, not to disintegrate the cell structure of the gluten but, rather to free it from the mineral salts which accompany, or which form constituents of, the gluten, so that the tensile qualities of the proteids in the fluor are left with their normal capacity to cohere when hydrated, and their elasticity is increased. The proteolytic materials in the composition having been rendered inactive, there is no breaking down of the cell structure of the flour proteids, and no agency is introduced to render the gluten soft or sticky.

The small amount of yeast which can be used with this composition, being in the presence of the dextrose and maltose therein (instead of being in the presence of cane sugar ordinarily mixed with the flour), is immediately supplied with its normal stimulant, and is not compelled to first transform sucrose into dextrose in order to have a store of stimulant. As soon as the initial stimulating of the yeast is started by the dextrose originally supplied the transforming of the maltose in the composition is readily induced. The proteid material required by the yeast for its cell building is taken by it, not from the flour of the dough but, from the acid nitrogenous material furnished in the composition, as above described. And as this nitrogenous material has been already digested, it is ready to be immediately utilized by the yeast, notwithstanding the acid still present. This acid, however, is sufficiently in excess to render inert the protease within the yeast mass itself.

In brief, the very small amount of yeast introduced into the flour, at the time my composition is also introduced, is immediately stimulated by dextrose and furnished with digested proteids, all within the composition itself. And the yeast is not called upon to break down, modify or digest any of the ingredients of the flour, but can rapidly multiply and effect extensive fermentation, though only a small amount is used.

If the usual large amount of yeast (two and a half pounds to one hundred pounds of flour) were used with my composition the usual quantity of fermentation would be effected in one-half the time required for fermentation when the composition is not present. But it is desirable that the fermentation should continue for a predetermined average period; hence, I can cut down the amount of yeast and effect the large economy set forth.

As neither the starchy bodies in the flour of the dough mass, nor the nitrogenous bodies are affected by the composition or by the yeast, I am able to attain the texture and consistency above described in the interior mass of the loaf. The loaf expands to a greater volume, relatively, because I increase the elasticity and strength of the gluten, for the walls of the cells (generated during fermentation by the gases) maintain their coherence even though largely expanded by those gases. And as these cell walls stiffen, during the stage of baking, they are, because of this increase in strength and elasticity, able to maintain the conformation to which they have been expanded. This is strikingly in contrast with the expanded walls of the cells produced in the dough when the common methods are followed, that is, when diastatic and proteolytic compositions are introduced into the dough. Loaves produced by these common methods, after expanding possibly to a large volume, manifest that the cell walls have broken down before the final settling or hardening; and there is a marked collapse (particularly at the sides) in the contour of the loaf.

I have specified a typical composition characterized by my improvements and have recited certain specific ingredients, and have also cited approximately close proportions; but it is to be noted that I do not limit myself to the specific bodies named or to precisely the proportions specified, or to the particular origin from which the ingredients are obtained. That which I believe to be new is a composition for dough characterized by the presence of saccharine bodies of the maltose and dextrose class, in suitable proportions, whereby the use of cane sugar (referred to typically) as a yeast stimulant can be omitted, or largely reduced in quantity together with digested nitrogenous materials adapted to nourish yeast, and acidified to the point where any diastatic or proteolytic body which may be present is made inert. It is also new, as I believe, to acidify such a composition to the point where it properly conditions the dough, the composition being sterile with respect to diastatic and proteolytic materials.

And with these qualities of the composition in mind, it will be seen that it can be produced by modifying the processes by which malt extracts have been heretofore made.

For example, some of the fluid masses obtained in the manufacture of such extracts, and containing maltose and dextrose, together with nitrogenous materials, can be employed. But in such cases diastatic activity and proteolytic activity must be overcome by suitable treatment, as by heating or acidifying, or both, and all organized ferments should be eradicated; and the nitrogenous materials should be digested, and the coagulable ingredients should be separated from the solution.

But where materials of the classes specified (sugary and nitrogenous) can be obtained, they can be combined, and even where they possess diastatic or proteolytic characteristics or have commingled materials possessing such characteristics, they can be acidified and treated in the way above described to obtain the specified results when mixed with the flour of the dough.

Of course, I do not mean to be understood as saying that other bodies usable in the making of bread must be excluded when this composition is employed. Thus, for example, if a highly colored crust is desired on the finished loaves, a small percentage of cane sugar can be added. It is understood by those acquainted with such matters that there are variations in the materials referred to, namely, maltose, dextrose, sucrose, some grades of maltose responding more rapidly than others to the inverting action of the yeast. And it may be found, under circumstances, that the percentage of the maltose or dextrose should be varied in order to meet these varying characteristics.

In my co-pending application, Ser. No. 175,024, filed June 15, 1917, I describe a method for producing a dough batch ingredient which is one of the methods that can be followed in preparing a material having the characteristics incident to the present composition. But I have been led to conclude that where the steps in treatment are followed which are set forth in said application Ser. No. 175,024, there are supplementary characteristics. By following that particular method each of the steps of treatment is characterized by results coming from the action of the several ferments which, while in vital condition, successively prepare the material for particular use at the next stage. But the present composition, by itself considered, is not dependent upon the supplemental characteristics resulting from such process.

What I claim as my invention is:

1. The herein described composition for use in a dough batch, containing sugary bodies of the maltose dextrose and dextrin class, inert diastase, inert proteolytic bodies, and water each in substantially the proportions set forth and being acidified sufficiently to maintain the inertness of the diastase and proteolytic bodies and to condition the gluten and similar bodies of the bread dough.

2. The herein described composition as an ingredient for a bread dough batch, composed of approximately seventy per cent. of saccharine matter as described, eight per cent. of digested protein, one and a half per cent. of lactic acid, inert diastase, inert proteolytic material, and fifteen to twenty-five per cent. of water.

3. The herein described ingredient for a bread dough batch, composed of water, saccharine matters of the maltose dextrose and dextrin class, acid-digested nitrogenous matter, and salts each in substantially the proportions set forth, and acidified not only to the point where any diastatic or proteolytic bodies that may be present are rendered and maintained inert but also to the point where the acid will be active in conditioning the gluten and other materials of the dough.

4. The herein described composition for use in a dough batch, containing sugary bodies of the maltose dextrose and dextrin class, inert diastase, digested nitrogenous matter, and water each in substantially the proportions set forth and being acidified sufficiently to maintain the inertness of the diastase and to condition the gluten and similar bodies of the bread dough.

5. The herein-described ingredient for a bread dough batch, composed of water, saccharine bodies of the maltose, dextrose and dextrin class, and acid-digested nitrogenous matter, and acidified to the point where any diastatic bodies that may be present are rendered inert and are, during the stages of dough making and baking, maintained inert.

6. The herein-described ingredient for a dough batch which is substantially free from enzyms, bacteria, or other ferments, and is characterized by saccharine bodies of the maltose, dextrose and dextrin class, soluble acid-digested nitrogenous bodies, and lactic acid, in proportions substantially as set forth.

7. The herein-described ingredient for a dough batch composed of saccharine bodies of the maltose, dextrose and dextrin class, together with lactic acid, and nitrogenous material rendered non-coagulable and soluble by said acid, and substantially free from dough-discoloring coagulates.

In testimony whereof I affix my signature in presence of two witnesses.

ROBERT L. CORBY.

Witnesses:
JOHN L. FLETCHER,
H. S. IMNIE.